Figure 1:
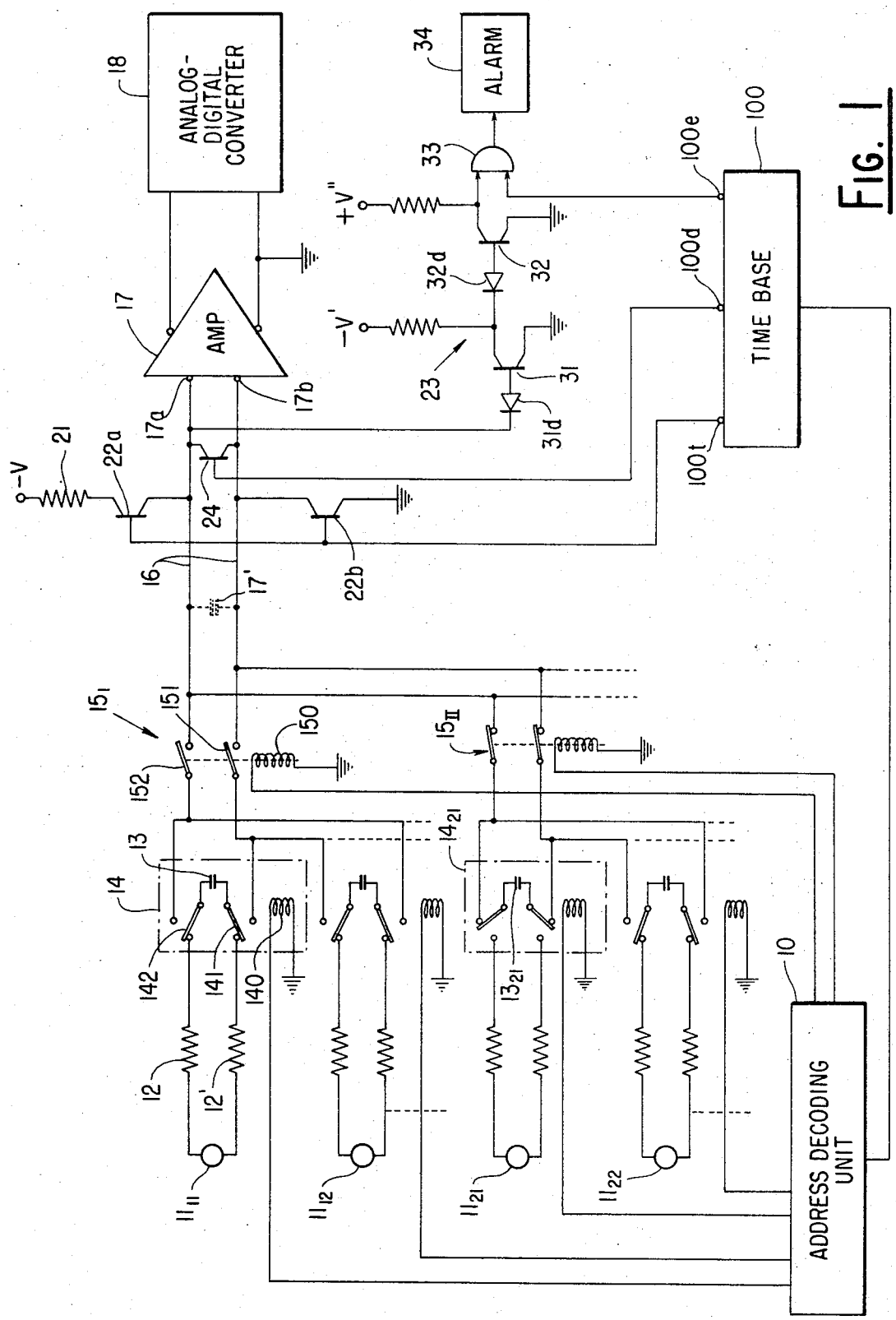

United States Patent [19]

Spira

[11] 3,731,296
[45] May 1, 1973

[54] TRANSFER CHECKING DEVICE FOR ANALOG DATA ACQUISITION SYSTEM

[75] Inventor: Nathan Spira, Clamart, France

[73] Assignee: Controle Bailey (Societe Anonyme), Clamart, France

[22] Filed: Jan. 28, 1972

[21] Appl. No.: 221,698

[30] Foreign Application Priority Data

Feb. 5, 1971 France..................................7103870

[52] U.S. Cl...............................340/248 A, 328/148
[51] Int. Cl..................................................G08b 21/00
[58] Field of Search....................340/248 A; 328/148

[56] References Cited

UNITED STATES PATENTS

| | | |
|---|---|---|
| 2,756,409 | 7/1956 | Lubkin........................340/248 A UX |
| 3,213,298 | 10/1965 | Luke..........................340/248 A UX |
| 3,289,193 | 11/1966 | Worthington et al.............340/248 A |
| 3,341,816 | 9/1967 | Davis et al. .....................340/248 A X |
| 3,657,660 | 4/1972 | Pfersch..........................328/148 |

*Primary Examiner*—John W. Caldwell
*Assistant Examiner*—Daniel Myer
*Attorney*—Joseph M. Maguire

[57] ABSTRACT

A data transfer checking device for an analog data acquisition system of the type in which each one of a plurality of data sources each delivering a data voltage are cyclically made to charge a capacitor, the charging voltage of which is subsequently transferred to the input terminals of an amplifier after the capacitor electrodes have been switched to said terminals. These terminals are respectively connected to the poles of a d.c. voltage source through the source-and-drain circuits of two field effect transistors, the gates of both of which receive test pulses from a time base. A difference voltage between the actual potential of one of said input terminals and a reference voltage is thus cyclically obtained, and this difference voltage is applied to one of the inputs of an AND gate, the other input of which cyclically receives sampling pulses from said time base. When the capacitor voltage has not been properly transferred, the difference voltage takes such a value that a signal appears at the output of the AND gate and actuates an alarm circuit. A third field effect transistor connected across the amplifier input and the gate of which cyclically receives discharge pulses eliminates any residual voltage existing at said amplifier input.

3 Claims, 2 Drawing Figures

TRANSFER CHECKING DEVICE FOR ANALOG DATA ACQUISITION SYSTEM

This invention relates to an analog data acquisition system provided with a transfer checking device.

More specifically, the invention relates to a system comprising a plurality of analog data sources each delivering said data in the form of analog voltages, each such source being provided with a capacitor effecting, by means of the switching of the contacts of an associated so-called channel relay controlled by an adress decoding unit, itself controlled by a time base, the cyclic transfer of the corresponding data, stored in the form of the load voltage of the said capacitor, to a differential amplifier, this being possibly done through the work contact of an intermediate, so-called "-decoupling" relay also controlled by the said decoding unit.

During such a transfer, it may happen that the data be not effectively transmitted to the amplifier, for instance as a result of a break in the channel or in the coil of the decoupling relay or of improper operation of relay contacts, capacitor break, defective soldered connections, faulty contacts, etc. In such a case, the data received by the amplifier varies at random. Its transmission to a utilization circuit will then suffer unwanted disturbances that some known systems are capable of detecting, but this usually too late to prevent their harmful effects.

The purpose of this invention is to obviate this drawback by offering a simple and reliable system enabling the detection of any faulty data transfer from its very beginning.

For this purpose and according to the invention, there is provided a system of the class defined hereabove, characterized in that the two inputs of the said differential amplifier are connected to the two poles of an auxiliary direct current voltage source delivering a voltage of value V greater than that of the maximum level voltage $v$ of the said data through the source and drain circuits of a first and a second field effect transistor respectively; in that the gates (control electrodes) of the said transistors are connected to a common test pulse source terminal at which recurrently appear test pulses of a predetermined duration controlled by the said time base; in that one so-called "-positive" of the inputs of the said amplifier is connected to a fault detector capable of comparing the potential of the latter amplifier input with an intermediate reference potential of fixed value comprised between V and $v$, this being done in such a manner that, during each de-energization period of a channel relay, the said test pulse causes both the said transistors to become conductive and that, in the case where the associated transfer capacitor has not been effectively connected to the amplifier, the said "positive" amplifier input connected to the said detector almost instantaneously takes a potential of value close to V, which causes the said detector to emit an output pulse transmitted to an alarm system; and finally in that a third field effect transistor having its source and drain electrodes respectively connected to the two amplifier inputs has its gate connected to a further terminal hereinafter called the "discharge pulse" terminal at which appear discharge pulses controlled by the said time base, so that, during each de-energization period of a channel relay, the corresponding one of the said discharge pulses has the effect of rendering the said third transistor conductive and cancelling the residual voltage between the amplifier inputs.

The duration of the test pulses must be so selected that it be long enough, in the case of the absence of a proper connection of the transfer capacitor, to give the positive input of the amplifier a sufficient time to take a potential high enough to actuate the fault detector, but insufficient to noticeably disturb the charge condition of the transfer capacitor.

Figure 2:
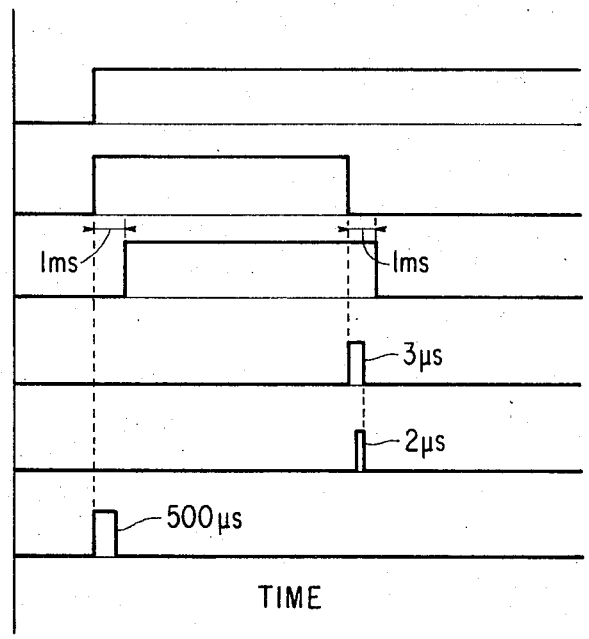

The invention will be better understood on reading the following description of a practical example of its embodiment, made with reference to the annexed drawings, in which:

FIG. 1 shows a block wiring diagram of a complete analog data acquisition system according to the invention; and FIG. 2 is a time chart explaining the method of operation of the system.

Referring first to FIG. 1, the reference numbers $11_{11}$, $11_{12}$, ..., $11_{21}$, $11_{22}$, ..., designate the analog data sources, which may be low voltage level sources (resistor probes, thermocouples) or high voltage level sources. Each of these sources, such as $11_1$, is connected by resistors such as 12, 12' (for filtering, protection, etc.) to an associated capacitor 13. Each capacitor 13 has a socalled channel relay 14 associated therewith and comprising a coil 140 fed from an address decoding unit 10, itself controlled by a time base 100, and two switchable contacts 141, 142. When channel relay 14 is in its rest condition, contacts 141, 142 connect capacitor 13 to the associated source $11_{11}$. Capacitor 13 then receives from $11_{11}$ a loading voltage representing the source voltage forming the analog data; when channel relay 14 passes to its working condition, the said contacts change their position and transmit the latter said voltage to a transfer line that will be described later on.

The first $p$ transfer lines are connected in parallel to a common so-called "decoupling" relay $15_I$, the next $p$ lines to a similar relay $15_{II}$ and so on. Each decoupling relay such as $15_I$ has a coil 150 connected to the address decoding unit 10 and two work contacts 151, 152. When a decoupling relay such as $15_I$ is energized, its contacts connect all the $p$ transfer lines associated therewith with a common two wire line 16 leading to the two inputs 17a, 17b of a differential amplifier 17, itself followed, for example, by an analog-digital converter 18.

The system is driven by time base 100 so that, during the time taken for relay $15_I$ to come to its working condition, the relays of sources $11_{11}$, $11_{12}$, ... be successively placed into operation, that during the time taken for relay $15_{II}$ to come to its working condition, relays $11_{21}$, $11_{22}$, ... be successively caused to operate, and so on. This sequential operating mode is simply taken as an example. The most general case, the actual fact, is that where the system is driven by a computer that causes transfers according to its program whilst simultaneously operating the corresponding relays such as 14 and $15_I$.

The system according to the invention includes a circuit consisting of the series-connection of a pole, for example −V, of a d.c. voltage source (not illustrated), a voltage stepping down resistor 21, the source-drain circuit of a first field effect transistor 22a, the capacitance 17' that may exist between the inputs of amplifier 17, the source-drain circuit of a second field effect transistor 22b, and finally the other pole +V of the said d.c. source, assumed for example to be grounded. The absolute value of V is taken as being more than that of the maximum voltage level v of the analog data.

The gates of transistors 22a, 22b are both connected to a terminal 100t of the time base, from which they are to receive a so-called test pulse.

The "positive" input 17a of amplifier 17 is connected to a fault detector 23, capable of comparing the potential of point 17a with a reference potential V', of intermediate value between those of v and V. In the illustrated example, this detector makes use of a negative channel field effect transistor, of a type well known as such, and on the whole includes the following:

a first field effect transistor 31, the gate of which is connected by a diode 31d to point 17a and the source-drain circuit of which is inserted in that of an auxiliary direct current source of voltage V', the value of V' being intermediate between those of v and V;

a second field effect transistor 32, the gate of which is connected by a diode 32d to the negative (source or drain) electrode of transistor 31 and the source-drain circuit of which is inserted in that of an auxiliary direct current V'' source, the value of V'' being appropriate to the logic circuit that follows;

an AND gate 33, of which one input is connected to the positve electrode of transistor 32, the other input to a terminal 100e of the time base, to receive therefrom a so-called sampling pulse;

an alarm system 34 connected to the output of AND gate 33.

Finally inputs 17a, 17b of amplifier 17 are respectively connected to the source and drain electrodes of a field effect transistor 24, the gate of which is connected to a terminal 100d of the time base, to receive therefrom a so-called discharge pulse.

The operating mode of the system thus described is the following:

For example, let it be assumed that relays $15_{11}$ and $14_{21}$ have both been placed into operation by signals received from the decoding unit 10 (lines A and B of the chart on FIG. 2). After the ceasing of such signals, and as a result of the de-energization delay of relay $14_{21}$, capacitor $13_{21}$ remains connected to the inputs of amplifier 17 during a time period of 1 millisecond (line C on chart) for example.

During the latter period, the time base 100 emits two pulses, a so-called test pulse, for example lasting for 3 microseconds, and a so-called sampling pulse, for example lasting for 2 microseconds, with simultaneous trailing edges (lines D and E on chart).

The effect of the test pulse is to render transistor 22a, 22b conductive. Two cases should be considered:

a. Capacitor $13_{21}$ has been effectively connected to amplifier 17, in which case it still is during the test. The test pulse duration is such that the charge of $13_{21}$ is practically not modified and that it will rapidly reach again, after the next switching operation, the voltage received from the associated source. The input potential 17a of the amplifier practically does not change at all. Detector 23 remains in its rest condition; or b. capacitor $13_{21}$, whatever the reason, has not been effectively connected to amplifier 17, in which case it remains unconnected during the test. In this case, the capacitance existing during the test between the inputs 17a, 17b of the amplifier, is reduced to that 17' of the line leading to the latter, which capacitance is much lower than that of capacitor $13_{21}$. The test pulse duration is then such that input 17a of the amplifier is almost instantaneously raised to a potential of the order of magnitude of V. Detector 23 is actuated, with the result that the two transistors 31, 32, which were previously conductive, pass to the blocked condition. A signal is transmitted to the AND gate 33 so that, when the sampling pulse is received from the terminal 100e of the time base 100, at the second input of this gate, the alarm system 34 is actuated.

To eliminate any residual voltage between inputs 17a, 17b of the amplifier, during each de-energization period of a relay such as $13_{21}$, a so-called discharge pulse is transmitted by the time base 100 to the gate of transistor 24 to render the latter conductive (line F on chart).

By way of example, the values of the various elements of the above-described system may be the following:

Capacity of each transfer capacitor 120 $\mu$F $\pm$ 20 percent

Maximum line capacity between amplifier inputs 1000 pF

Ohmic value of the series resistor in each channel: 6000 $\Omega$ $\pm$ 10 percent
of resistor 21 600 $\Omega$
of each of the resistances of transistors 22a, 22b in the conductive state 20 $\Omega$ Direct current voltage 17 V $\pm$ 1 percent Scanning repetition period for each channel 0.3 second It is proposed to calculate the maximum error resulting in the data transfer as a result of the operation of the system in accordance with the invention, in the most unfavorable case.

Calculation gives the following values for the parameters of the system:

Time constant of capacitor charging, source side:

$$120 \times 1.2 \times 10^{-6} \times 6000 \times 1.1 = 0.95 \text{ second}$$

Remaining percentage of capacitor charge when switched for transfer:

$$\exp.(-0.3/0.95) = 0.74$$

Time constant on amplifier side of charge variation of a transfer capacitor:

$$120 \times 1.2 \times 10^{-6} \times 640 = 92 \text{ milliseconds}$$

Charge variation of same capacitor during test pulse:

$$17.01\,(1-\exp.[3.10^{-6}/92.10^{-3}\text{b}]) = 0.55\ m\text{V}$$

Remanent charge of the transfer capacitor:
at end of first scanning $$0.55 \times 0.74 = 0.4\ m\text{V}$$

at end of second scanning $$(0.4 + 0.55) \cdot 0.74 = 0.7\ m\text{V}$$

at end of tenth scanning 1.46 $m$V such an event the pressure would decrease until it is within the narrow "substantial pressure balance" range. This results in the bellows moving movable contact 16 to the neutral position whereupon source 5 will cease energizing relay 13 and battery 11 will begin energizing relay 13. Owing to the existence of the leak, the pressure within the tank will remain in that narrow range for as long as the leak exists, irrespective of changes in the magnitude of the load. Accordingly, if the leak is still in existence at the time that the battery has discharged to the point where the amount of energy remaining in it is insufficient to provide relay energizing current, the relay will be deenergized. Upon the deenergization of relay 13, movable contact 18 will close stationary contacts 17, thereby actuating the warning circuit and producing a signal indicative of the existence of the leak.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A leak detector for determining when the pressure within a closed, fluid containing enclosure is substantially equal to the pressure without said enclosure, and for providing a warning signal when such a condition has existed for a preselected period of time, said detector comprising:
    a. movable means responsive to the pressure within the enclosure;
    b. dischargeable energy storage means;
    c. first means coupled to said movable means for energizing said energy storage means except when the pressure within the enclosure is substantially equal to the pressure without the enclosure; and
    d. means adapted for providing a warning signal in response to the discharge of said energy storage means.

2. The leak detector as specified in claim 1 wherein said energy storage means includes a storage battery and wherein said signal producing means is responsive to the discharge of a predetermined portion of the energy stored by said battery.

3. The leak detector as specified in claim 2 wherein said movable means includes a bellows and wherein said first means comprises a switch means connected to said bellows and a source of energy, said source of energy being connected to said battery via said switch means.

4. A leak detector for determining when the pressure within a sealed transformer tank containing a dielectric liquid is substantially equal to the pressure without said tank and for providing a warning signal when such a condition has existed for a preselected period of time, said detector comprising:
    a. movable means responsive to the pressure within the tank;
    b. dischargeable energy storage means;
    c. energy supply means coupled to said energy storage means;
    d. switch means coupled to said movable means connecting said energy supply means to energize said energy storage means except when the pressure within the tank is substantially equal to the pressure without the tank; and
    e. means for providing a warning signal in response to the discharge of a preselected amount of energy stored in said storage means.

5. In an electric translating apparatus coupled to an electric load, said apparatus being housed within a sealed tank containing a dielectric fluid, the magnitude of the pressure within the tank being variable in response to changes in the magnitude of said load, a leak detector coupled to said tank for determining when the pressure within the tank is substantially equal to the pressure without said tank and for providing a warning signal when such a condition has existed for a preselected period of time, said detector comprising:
    a. movable means responsive to the pressure with the tank;
    b. dischargeable energy storage means;
    c. energy supply means coupled to said energy storage means;
    d. switch means coupled to said movable means connecting said energy supply means to energize said energy storage means except when the pressure within the tank is substantially equal to the pressure without the tank; and
    e. means for providing a warning signal in response to the discharge of a preselected amount of energy stored in said storage means.

* * * * *